(12) United States Patent
Kobayashi et al.

(10) Patent No.: US 9,527,979 B2
(45) Date of Patent: Dec. 27, 2016

(54) RESIN COMPOSITION, PREPREG, AND LAMINATE

(71) Applicant: MITSUBISHI GAS CHEMICAL COMPANY, INC., Tokyo (JP)

(72) Inventors: Hiroaki Kobayashi, Tokyo (JP); Masanobu Sogame, Tokyo (JP); Yoshihiro Kato, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 433 days.

(21) Appl. No.: 14/355,674

(22) PCT Filed: Oct. 30, 2012

(86) PCT No.: PCT/JP2012/078062
§ 371 (c)(1),
(2) Date: May 1, 2014

(87) PCT Pub. No.: WO2013/065694
PCT Pub. Date: May 10, 2013

(65) Prior Publication Data
US 2014/0377565 A1    Dec. 25, 2014

(30) Foreign Application Priority Data

Nov. 2, 2011 (JP) ................. 2011-241172

(51) Int. Cl.

| | |
|---|---|
| *B32B 9/04* | (2006.01) |
| *C08K 3/36* | (2006.01) |
| *C08J 5/24* | (2006.01) |
| *C08G 59/40* | (2006.01) |
| *C08K 3/00* | (2006.01) |
| *C08K 5/315* | (2006.01) |
| *C08L 63/00* | (2006.01) |
| *C08G 59/32* | (2006.01) |
| *C08L 65/02* | (2006.01) |

(52) U.S. Cl.
CPC ............. *C08K 3/36* (2013.01); *C08G 59/3218* (2013.01); *C08G 59/40* (2013.01); *C08J 5/24* (2013.01); *C08K 3/00* (2013.01); *C08K 5/315* (2013.01); *C08L 63/00* (2013.01); *C08L 65/02* (2013.01); *Y10T 428/31511* (2015.04); *Y10T 428/31529* (2015.04)

(58) Field of Classification Search
None
See application file for complete search history.

(56) References Cited

U.S. PATENT DOCUMENTS

| | | |
|---|---|---|
| 2005/0182203 A1 | 8/2005 | Sugano et al. |
| 2006/0084787 A1 | 4/2006 | Sugano et al. |
| 2009/0130488 A1 | 5/2009 | Sugano et al. |
| 2011/0194261 A1 | 8/2011 | Tanaka et al. |

FOREIGN PATENT DOCUMENTS

| | | |
|---|---|---|
| CN | 101283022 | 10/2008 |
| JP | 07-106767 | 4/1995 |
| JP | 11-124433 | 5/1999 |
| JP | 2000-191776 | 7/2000 |
| JP | 2005-264154 | 9/2005 |
| JP | 2010-174242 | 8/2010 |
| JP | 2011-178992 | 9/2011 |
| WO | 2007-049422 | 5/2007 |

OTHER PUBLICATIONS

International Search Report Issued 29 Jan., 2013 in PCT/JP2012/078062.

*Primary Examiner* — Coris Fung
(74) *Attorney, Agent, or Firm* — Greenblum & Bernstein, P.L.C.

(57) ABSTRACT

A resin composition of the present invention contains a mixture (A) of at least two of cyanate ester compounds selected from the group consisting of cyanate ester compounds (A1) to (A3) having a specific structural unit, an epoxy resin (B), and an inorganic filler (C). A prepreg of the present invention is obtained by impregnating a base material with the resin composition or applying the resin composition to a base material. Furthermore, a metal foil-clad laminate of the present invention is the laminate comprising the prepreg. Furthermore, a printed wiring board of the present invention contains an insulating layer and a conductor layer formed on a surface of the insulating layer, in which the insulating layer contains the resin composition.

16 Claims, No Drawings

RESIN COMPOSITION, PREPREG, AND LAMINATE

TECHNICAL FIELD

The present invention relates to a resin composition, a prepreg, and a laminate.

BACKGROUND ART

High-density wiring and high integration have progressed in printed wiring boards widely used for electronic equipment, communication apparatuses, and personal computers or the like. As a result, metal foil-clad laminates used for the printed wiring boards are required to have excellent properties such as heat resistance, low water absorbance, moisture absorption-heat resistance, and peel strength.

Conventionally, FR-4 type laminates in which epoxy resins are cured with dicyandiamide have been widely used as laminates for printed wiring boards. However, it is difficult to cope with a demand for high heat resistance by means of the FR-4 type laminates.

A technique of incorporating with a cyanate ester compound into a laminate has been known as a method for imparting heat resistance to the laminate. As the cyanate ester compound, for example, a bisphenol A-based cyanate ester compound and a novolac-based cyanate ester compound have been known (for example, see Patent Documents 1 to 3).

As one of methods for imparting water absorbance and moisture absorption-heat resistance to a laminate, a technique of incorporating a cyanate ester compound having a biphenyl skeleton to the laminate has been known (for example, see Patent Document 4).

LIST OF PRIOR ART DOCUMENTS

Patent Document

Patent Document 1: Japanese Patent Laid-Open No. 07-106767
Patent Document 2: Japanese Patent Laid-Open No. 11-124433
Patent Document 3: Japanese Patent Laid-Open No. 2000-191776
Patent Document 4: Japanese Patent Laid-Open No. 2010-174242

SUMMARY OF INVENTION

Problems to be Solved by Invention

However, the laminates with which the cyanate ester compounds described in Patent Documents 1 to 3 are incorporated have excellent properties such as electrical properties, mechanical properties, chemical resistance, and adhesive properties. However, the laminates are insufficient in terms of water absorbance or moisture absorption-heat resistance in some cases.

The cyanate ester compound having a biphenyl skeleton described in Patent Document 4 has poor solubility in a solvent. Therefore, the cyanate ester compound described in Patent Document 4 has a high melt viscosity depending on a condition of taking out and storing during producing, and gradually deposits and precipitates when the cyanate ester compound is dissolved in the solvent. The laminate with which the cyanate ester compound is incorporated has problems such as deteriorated moldability and extremely deteriorated appearance after being etched.

Then, it is an object of the present invention to provide a resin composition having excellent solubility in a solvent (solvent solubility) and good handleability. It is another object of the present invention to provide a resin composition capable of realizing a metal foil-clad laminate having good adhesive properties, low water absorbance, heat resistance when absorbing moisture (moisture absorption-heat resistance), insulating reliability, and appearance.

Means for Solving Problems

The present inventors have conducted intensive research in order to solve the above-mentioned problems. As a result, the present inventors have found that a resin composition which contains a mixture of position isomers of a cyanate ester compound having a specific structure as well as an epoxy resin and an inorganic filler has remarkably improved solvent solubility. Furthermore, the present inventors have found that a metal foil-clad laminate containing such a resin composition has excellent properties such as adhesive properties, low water absorbance, moisture absorption-heat resistance, insulating reliability, and appearance. The present invention has been accomplished on the basis of these findings.

That is, the present invention relates to the following.

[1]

A resin composition comprising:

a mixture (A) of at least two cyanate ester compounds selected from the group consisting of a cyanate ester compound (A1) having a structural unit represented by the following general formula (1), a cyanate ester compound (A2) having a structural unit represented by the following general formula (2), and a cyanate ester compound (A3) having a structural unit represented by the following general formula (3);

an epoxy resin (B); and an inorganic filler (C):

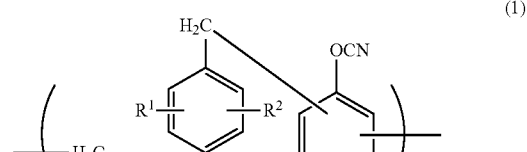

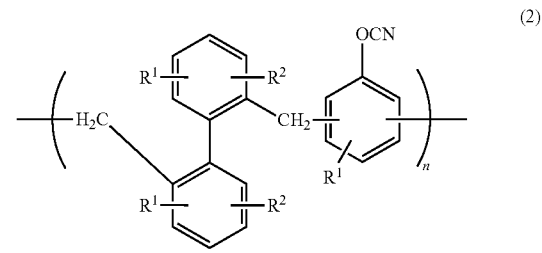

(3)

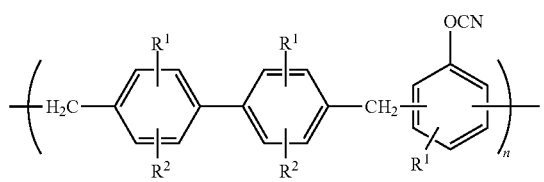

wherein n is each independently an integer of 1 or more, and $R^1$ and $R^2$ are each independently a hydrogen atom, an alkyl group, or an aryl group.

[2]

The resin composition according to [1], wherein a mixing ratio of the cyanate ester compound (A1) is 30 to 70 mol %, a mixing ratio of the cyanate ester compound (A2) is 15 to 45 mol %, and a mixing ratio of the cyanate ester compound (A3) is 5 to 35 mol %, based on 100 mol % of the total of the mixture (A) of the cyanate ester compounds.

[3]

The resin composition according to [1] or [2], wherein n in the general formulae (1) to (3) is each independently an integer of 1 to 50.

[4]

The resin composition according to any of [1] to [3], wherein the epoxy resin (B) is an aralkyl-based epoxy resin.

[5]

The resin composition according to [4], wherein the aralkyl-based epoxy resin is at least one selected from the group consisting of a phenol phenyl aralkyl-based epoxy resin represented by the following general formula (4), a phenol biphenyl aralkyl-based epoxy resin represented by the following general formula (5), and a naphthol aralkyl-based epoxy resin represented by the following general formula (6):

(4)

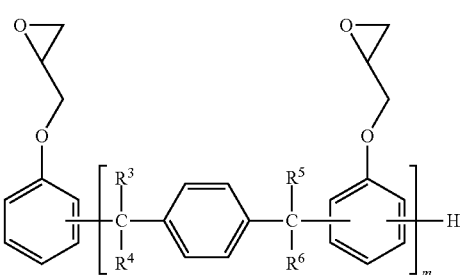

(5)

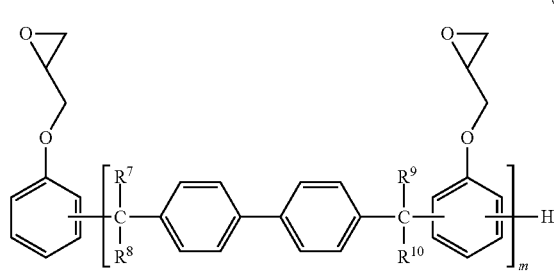

(6)

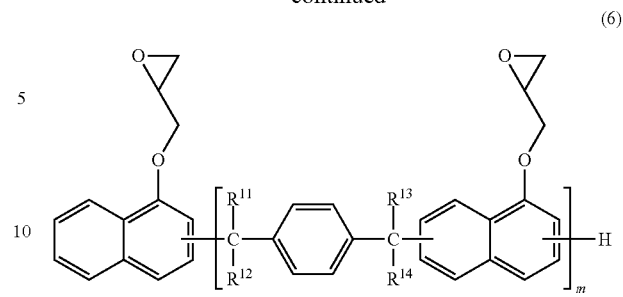

wherein m is each independently an integer of 1 to 50; $R^3$ to $R^{14}$ are each independently a hydrogen atom, a methyl group, an ethyl group, or an aryl group.

[6]

The resin composition according to any of [1] to [5], wherein the inorganic filler (C) is silica.

[7]

The resin composition according to any of [1] to [6], wherein a content of the mixture (A) of the cyanate ester compounds is 10 to 90 parts by mass based on 100 parts by mass of the total of the mixture (A) of the cyanate ester compounds and the epoxy resin (B).

[8]

The resin composition according to any of [1] to [7], wherein a content of the inorganic filler (C) is 10 to 1000 parts by mass based on 100 parts by mass of the total amount of the mixture (A) of the cyanate ester compounds and the epoxy resin (B).

[9]

A prepreg obtained by impregnating a base material with the resin composition according to any one of [1] to [8] or applying the resin composition to a base material.

[10]

A metal foil-clad laminate comprising the prepreg according to [9].

[11]

A printed wiring board comprising an insulating layer, and a conductor layer formed on a surface of the insulating layer, wherein the insulating layer comprises the resin composition according to any of [1] to [8].

Advantages of Invention

The resin composition of the present invention has high solvent solubility, and has excellent handleability. A laminate and a metal foil-clad laminate prepared by curing prepregs obtained using the resin composition have excellent adhesive properties, low water absorbance, heat resistance in moisture absorption, insulating reliability, and appearance or the like.

Mode for Carrying Out Invention

Hereinafter, an embodiment of the present invention (hereinafter, also described to as "present embodiment") will be described in detail. The following embodiment is exemplified to describe the present invention, and the present invention is not limited only to the embodiment.

<<Resin Composition>>

A resin composition of the present embodiment contains a mixture (A) of at least two cyanate ester compounds selected from the group consisting of a cyanate ester compound (A1) having a structural unit represented by the following general formula (1), a cyanate ester compound (A2) having a structural unit represented by the following general formula (2), and a cyanate ester compound (A3) having a structural unit represented by the following general formula (3), an epoxy resin (B), and an inorganic filler (C).

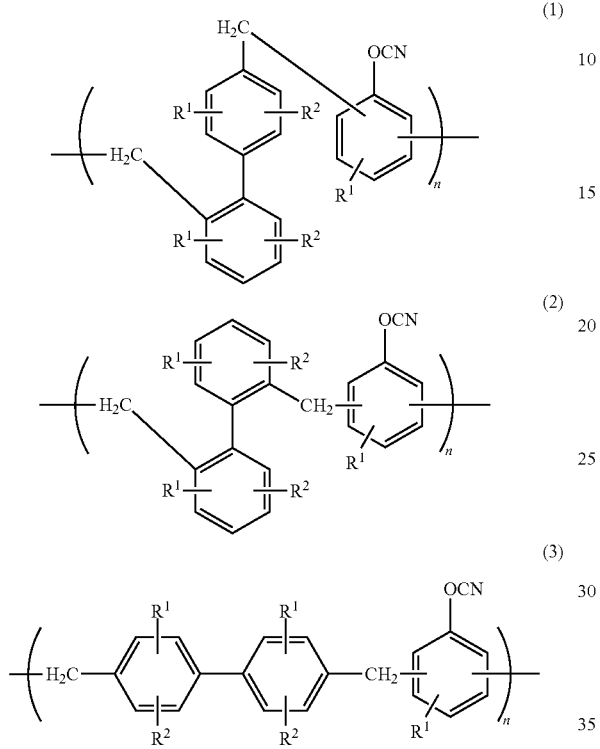

(In the general formulae (1) to (3), n is each independently an integer of 1 or more, and $R^1$ and $R^2$ are each independently a hydrogen atom, an alkyl group, or an aryl group).
<Mixture (A) of Cyanate Ester Compounds>

The mixture (A) of the cyanate ester compounds used for the present embodiment is a mixture of at least two cyanate ester compounds selected from the group consisting of the cyanate ester compounds (A1) to (A3).

The mixture (A) of the cyanate ester compounds used for the present embodiment is preferably a mixture of the cyanate ester compounds (A1) and (A2), a mixture of the cyanate ester compounds (A1) and (A3), a mixture of the cyanate ester compounds (A2) and (A3), or a mixture of the cyanate ester compounds (A1), (A2) and (A3), and more preferably a mixture of the cyanate ester compounds (A1), (A2) and (A3). The mixture (A) may contain prepolymers of the cyanate ester compounds (A1) to (A3).

In the above-mentioned general formulae (1) to (3), n is preferably each independently an integer of 1 to 50, more preferably an integer in the range of 1 to 20, and still more preferably an integer in the range of 1 to 10.

The cyanate ester compound (A1) may be a mixture containing a plurality of compounds each having different n in the above-mentioned general formula (1). The same applies to the cyanate ester compounds (A2) and (A3).

In the general formulae (1) to (3), $R^1$ and $R^2$ are preferably each independently a hydrogen atom, an alkyl group, or an aryl group, more preferably a hydrogen atom, a methyl group, an ethyl group, a propyl group, a phenyl group, a naphthyl group, or a biphenyl group, and still more preferably a hydrogen atom, a methyl group, an ethyl group, or a phenyl group.

A method for producing the mixture (A) of the cyanate ester compounds is not particularly limited. For example, a method for using a mixture of phenol compounds represented by the following general formulae (1)' to (3)' corresponding to the cyanate ester compounds (A1) to (A3) as a raw material, for cyanation of the phenol compounds in the mixture (cyanate synthesis method) is preferable from the viewpoint of easy production.

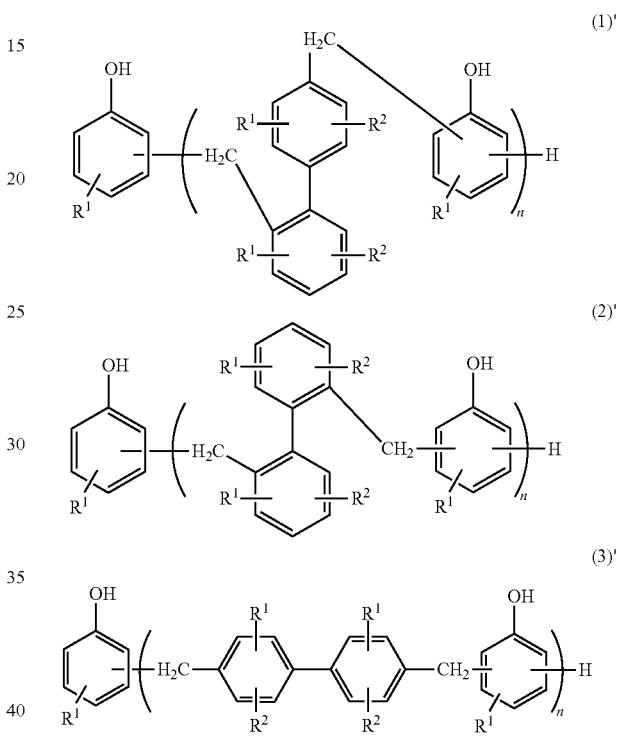

(In the general formulae (1)' to (3)', n is each independently an integer of 1 or more, and $R^1$ and $R^2$ are each independently a hydrogen atom, an alkyl group, or an aryl group).

A method for cyanation of the phenol compound is not particularly limited, and known methods can be applied. For example, a method described in IAN HAMERTON, "Chemistry and Technology of Cyanate Ester Resins", BLACKIE ACADEMIC & PROFESSIONAL can be used. The mixture of the cyanate ester compounds (A1) to (A3) can be obtained by cyanation of the phenol compounds represented by above-mentioned general formula (1)' to (3)' according to the method. Another method for cyanation of the phenol compound is not particularly limited. Examples thereof include a method in which a phenol is reacted with a cyanogen halide in a solvent in the presence of a base in such a state that the cyanogen halide is always present in excess over the base (U.S. Pat. No. 3,553,244); a method in which a phenol is reacted with a cyanogen halide using a tertiary amine as a base in excess over the cyanogen halide (Japanese Patent Laid-Open No. 7-53497); a method in which a phenol is reacted with a cyanogen halide in the presence of a trialkylamine by a continuous plug flow system (National Publication of International Patent Application No. 2000-501138); a method in which a phenol is reacted with a cyanogen halide in an nonaqueous solution in the presence of a tertiary amine and a tert-ammonium halide produced as a by-product in this reaction is treated with an cation/anion exchange pair (National Publication of International Patent Application No. 2001-504835); a method which includes reacting a phenol compound with a tertiary amine and a cyanogen halide by simultaneous addition in the presence of a solvent separable from water, conducting water washing and separation of the product solution, and purifying the resulting solution by precipitation using secondary or tertiary alcohols or poor solvents for hydrocarbons (Japanese Patent No. 2991054); and a method in which naphthols, a cyanogen halide, and a tertiary amine are reacted in a two-phase solvent composed of water and an organic solvent under acidic conditions (Japanese Patent Laid-Open No. 2007-277102). In the present embodiment, the cyanate ester compound can be obtained by suitably using these methods. The cyanate ester compound obtained by the above-mentioned methods can be identified by known methods such as NMR.

The mixing ratios of the cyanate ester compounds (A1) to (A3) in the mixture (A) of the cyanate ester compounds used for the present embodiment are not particularly limited so long as the components are contained in the mixture (A). For example, the mixing ratio of the cyanate ester compound (A1) is preferably 30 to 70 mol %, and still more preferably 40 to 60 mol %, based on 100 mol % of the total of the mixture (A). The mixing ratio of the cyanate ester compound (A2) is preferably 15 to 45 mol % and still more preferably 20 to 40 mol %, based on 100 mol % of the total of the mixture (A). Furthermore, the mixing ratio of the cyanate ester compound (A3) is preferably 5 to 35 mol % based on 100 mol % of the total of the mixture (A), and still more preferably 10 to 30 mol % from the viewpoint of the solubility of the resin composition in the solvent.

In the resin composition of the present embodiment, the content of the mixture (A) of the cyanate ester compounds is not particularly limited. However, the content is preferably 10 to 90 parts by mass and particularly preferably 30 to 70 parts by mass, based on 100 parts by mass of the total of the mixture (A) of the cyanate ester compounds and the epoxy resin (B). The resin composition containing the mixture (A) of the cyanate ester compounds within the range has improved solvent solubility and curability. A laminate obtained from the resin composition has improved heat resistance. Particularly, the resin composition containing 30 to 70 parts by mass of the mixture (A) of the cyanate ester compounds has further improved solvent solubility. The laminate obtained from the resin composition has further improved properties such as heat resistance.

A cyanate ester compound other than the mixture (A) of the cyanate ester compounds can also be used together for the resin composition of the present embodiment. The cyanate ester compound other than the mixture (A) of the cyanate ester compounds is not particularly limited, and known cyanate ester compounds can be used. Examples thereof include a bisphenol A-based cyanate ester compound, a bisphenol F-based cyanate ester compound, a bisphenol M-based cyanate ester compound, a bisphenol P-based cyanate ester compound, a bisphenol E-based cyanate ester compound, a phenol novolac-based cyanate ester compound, a cresol novolac-based cyanate ester compound, a dicyclopentadiene novolac-based cyanate ester compound, a tetramethylbisphenol F-based cyanate ester compound, a biphenol-based cyanate ester compound, a phenol aralkyl-based cyanate ester compound, a xylenol aralkyl-based cyanate ester compound, a naphthol aralkyl-based cyanate ester compound, and prepolymers thereof. These cyanate ester compounds can be used singly or at least two cyanate ester compounds can be properly used in combination.

<Epoxy Resin (B)>

The epoxy resin (B) used for the present embodiment is not particularly limited. However, the epoxy resin (B) is preferably an epoxy resin usually used for a printed wiring board material. Typical examples of the epoxy resin (B) include non-halogen epoxy resins from the viewpoint of a recent growing interest in environmental problems. Among them, examples of such non-halogen epoxy resins include bisphenol A-based epoxy resins, bisphenol F-based epoxy resins, phenol novolac-based epoxy resins, cresol novolac-based epoxy resins, bisphenol A novolac-based epoxy resins, trifunctional phenol-based epoxy resins, tetrafunctional phenol-based epoxy resins, naphthalene-based epoxy resin, biphenyl-based epoxy resins, aralkyl-based epoxy resins, alicyclic epoxy resins, polyol-based epoxy resins, compounds obtained by epoxidizing a double bond, such as glycidylamines, glycidyl esters and butadiene, and compounds obtained by reacting hydroxyl-containing silicone resins with epichlorohydrin. The aralkyl-based epoxy resins are particularly preferable in order to improve flame retardance.

Examples of the aralkyl-based epoxy resins include phenol phenyl aralkyl-based epoxy resins represented by the following general formula (4), phenol biphenyl aralkyl-based epoxy resins represented by the following general formula (5), and naphthol aralkyl-based epoxy resins represented by the following general formula (6).

Among them, from the viewpoints of the heat resistance and flame retardance of the obtained resin composition, the phenol biphenyl aralkyl-based epoxy resins represented by the general formula (5) are particularly preferable. The aralkyl-based epoxy resins can be used singly for any purpose or at least two aralkyl-based epoxy resins can be properly used in combination.

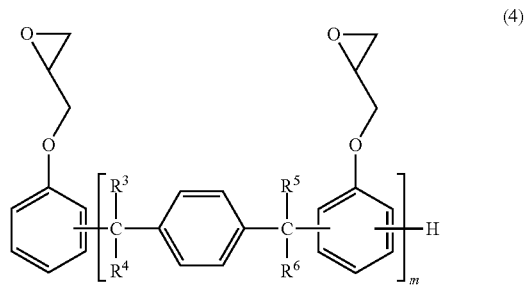

(4)

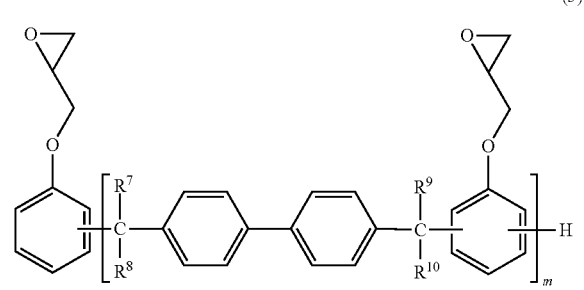

(5)

-continued (6)

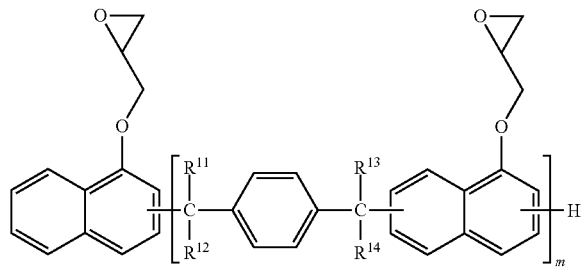

(In the general formulae (4) to (6), m is each independently an integer of 1 to 50, and $R^3$ to $R^{14}$ are each independently a hydrogen atom, a methyl group, an ethyl group, or an aryl group).

In the resin composition of the present embodiment, the content of the epoxy resin (B) is preferably 10 to 90 parts by mass, and particularly preferably in the range of 30 to 70 parts by mass, based on 100 parts by mass of the total of the mixture (A) of the cyanate ester compounds and the epoxy resin (B). When the content of the epoxy resin (B) is within the range, the obtained resin composition has excellent curability and heat resistance.

<Inorganic Filler (C)>

The inorganic filler (C) used for the present embodiment is not particularly limited so long as it is generally used. Examples thereof include silicas such as natural silica, fused silica, amorphous silica and hollow silica; metal hydrates such as aluminum hydroxide, a heat-treated product of aluminum hydroxide (obtained by heat-treating aluminum hydroxide and decreasing crystal water partially), boehmite and magnesium hydroxide; molybdenum compounds such as molybdenum oxide and zinc molybdate; zinc borate, zinc stannate, alumina, clay, kaolin, talc, calcined clay, calcined kaolin, calcined talc, mica, short glass fiber (fine powders of glasses such as E-glass and D-glass) and hollow glass. Among them, silica is particularly preferable from the viewpoint of the low water absorbance of the resin composition, or the like.

The average particle diameter (D50) of the inorganic filler (C) is preferably 0.1 to 10 μm, and more preferably 0.2 to 5 μm. The inorganic fillers (C) which are different from each other in terms of particle size distribution and average particle diameter can be properly used in combination. Herein, D50 means a median diameter and is a diameter at which, when the particle size distribution of the measured powder is divided into two parts, the volume of the particles having a larger particle side is equal to the volume of the particles having a smaller particle side. The D50 value is generally measured by a wet laser diffraction scattering method.

In the resin composition of the present embodiment, the content of the inorganic filler (C) is not particularly limited. However, the content is preferably 10 to 1000 parts by mass, more preferably 10 to 300 parts by mass, still more preferably 30 to 300 parts by mass, and particularly preferably 30 to 200 parts by mass, based on 100 parts by mass of the total of the mixture (A) of the cyanate ester compounds and the epoxy resin (B).

The inorganic filler (C) used for the present embodiment can also be treated by a silane-coupling agent or a wetting and dispersing agent. The inorganic filler (C) treated by the silane-coupling agent has improved wettability to a resin and a glass cloth. The inorganic filler (C) treated by the wetting and dispersing agent has improved dispersibility in a resin solution.

The silane-coupling agent is not particularly limited so long as it is generally used for surface-treating of inorganic substances. Examples thereof include aminosilane coupling agents such as γ-aminopropyltriethoxysilane and N-β-(aminoethyl)-γ-aminopropyltrimethoxysilane, epoxysilane coupling agents such as γ-glycidoxypropyltrimethoxysilane, vinylsilane coupling agents such as γ-methacryloxypropyl-trimethoxysilane, cationic silane coupling agents such as N-β-(N-vinylbenzylaminoethyl)-γ-aminopropyltrimethoxysilane hydrochloride, and phenylsilane coupling agents. The silane coupling agents can be used singly or at least two silane coupling agents can be properly used in combination.

The wetting and dispersing agent is not particularly limited so long as it is a dispersion stabilizer usually used for coatings. Examples thereof include copolymer-based wetting and dispersing agents having an acid group such as Disperbyk-110, 111, 996 and W903 manufactured by Big Chemie Japan.

<Other Components>

The resin composition of the present embodiment may contain a curing accelerator, if needed, for the purpose of properly adjusting the curing speed. The curing accelerator is not particularly limited so long as it is generally used as the curing accelerator for the mixture (A) of the cyanate ester compounds, and the epoxy resin (B). Examples of the curing accelerator include organometal salts of copper, zinc, cobalt and nickel or the like; imidazoles and derivatives thereof; and tertiary amines.

The resin composition of the present embodiment may contain an organic solvent. The organic solvent is not particularly limited so long as it can dissolve the mixture (A) of the cyanate ester compounds and the epoxy resin (B). Example thereof include ketones such as acetone, methyl ethyl ketone, methyl isobutyl ketone and cyclohexanone; aromatic hydrocarbons such as benzene, toluene and xylene; and amides such as dimethylformamide and dimethylacetamide.

The resin composition of the present embodiment may contain a variety of high polymer compounds such as a different thermosetting resin, thermoplastic resin and oligomers thereof, and elastomers, a different flame retardant compound or an additive, so long as the expected properties of the resin composition are not impaired. They are not particularly limited so long as they are generally used. Examples of the flame retardant compound include, but are not particularly limited to, phosphorus compounds such as a phosphoric acid ester and a phosphoric acid melamine; nitrogen-containing compounds such as melamine and benzoguanamine; oxazine-ring-containing compounds; and silicone compounds. Examples of the additive include, but are not particularly limited to, an ultraviolet absorber, an antioxidant, a photopolymerization initiator, a fluorescent brightening agent, a photosensitizer, a dye, a pigment, a thickener, a lubricant, an antifoamer, a dispersing agent, a leveling agent, a brightener, and a polymerization inhibitor. These additives may be properly used in combination if necessary.

<Method for Producing Resin Composition>

A method for producing the resin composition of the present embodiment is not particularly limited so long as it can provide the resin composition containing the mixture (A) of the above-mentioned cyanate ester compounds, the epoxy resin (B), and the inorganic filler (C). Examples thereof include a method comprising blending the epoxy resin (B) with the inorganic filler (C), dispersing the epoxy resin (B) and the inorganic filler (C) in a homomixer or the like, and further blending the mixture (A) of the cyanate ester compounds with the dispersed product. When the resin composition of the present embodiment is used for a prepreg to be described below, it is preferable that an organic solvent is previously added to the resin composition to lower the viscosity of the resin composition, improve the handleability, and, at the same time, enhance impregnation of the resin composition into a base material such as a glass cloth. The organic solvent is not particularly limited so long as it can dissolve the mixture (A) of the cyanate ester compounds and the epoxy resin (B). Example thereof include ketones such as acetone, methyl ethyl ketone, methyl isobutyl ketone and cyclohexanone; aromatic hydrocarbons such as benzene, toluene and xylene; and amides such as dimethylformamide and dimethylacetamide.

Since the resin composition of the present embodiment contains the mixture (A) of the above-mentioned specific cyanate ester compounds to increase the solvent solubility, thereby dramatically improving the handleability, a high-quality prepreg can be formed. Furthermore, a metal foil-clad laminate having excellent heat resistance, flame retardance, adhesive properties, low water absorbance, heat resistance in moisture absorption, insulating reliability, and appearance can be obtained by using the high-quality prepreg.

<<Prepreg>>

The prepreg of the present embodiment is a prepreg obtained by impregnating a base material with the above-mentioned resin composition or applying the resin composition to a base material.

A method of producing the prepreg of the present embodiment is not particularly limited so long as it is a method in which the prepreg is produced by combining a resin composition containing, as essential components, the mixture (A) of the cyanate ester compounds, the epoxy resin (B), and the inorganic filler (C) with a base material. Examples thereof include a method in which the resin composition is impregnated into or applied to the base material, and then the impregnated or applied resin composition is semi-cured by heating the resultant base material with the resin composition in a dryer at 100 to 200° C. for 1 to 60 minutes, preferably for 1 to 30 minutes, to produce the prepreg. With regard to the amount of the resin composition applied to the base material, the amount of the resin in the prepreg (containing the inorganic filler (C)) is preferably 20 to 95% by mass, and more preferably in the range of 30 to 90% by mass.

The base material used for the present embodiment is not particularly limited. Known base materials used for various materials for printed wiring boards may be properly selected and used depending upon contemplated applications and performances. Examples thereof include, but are not particularly limited to, glass fibers such as E-glass, D-glass, S-glass, Q-glass, spherical glass, NE-glass, and T-glass; inorganic fibers other than the glass such as quartz; and organic fibers such as wholly aromatic polyamides, i.e., poly-paraphenylene terephthalamide (Kevlar (registered trademark) manufactured by E.I. du Pont de Nemours and Company) and copoly-paraphenylene 3,4'oxydiphenylene terephthalamide (Technora (registered trademark) manufactured by Teijin Techno Products Limited), polyesters, i.e., 2,6-hydroxy naphthoic acid p-hydroxybenzoic acid (Vectran (registered trademark) manufactured by Kuraray Co., Ltd.), poly(p-phenylenebenzobisoxazole) (Zylon (registered trademark) manufactured by Toyobo Co., Ltd.), and polyimide.

Among them, from the viewpoint of low thermal expansibility, E-glass, T-glass, S-glass, and Q-glass are preferable. The base materials may be properly selected depending upon contemplated applications and performances. The base materials may be used singly or in combinations of two or more. Examples of the shape of the base material include, but are not particularly limited to, a woven cloth, a nonwoven cloth, a roving, a chopped strand mat, and a surfacing mat. Examples of a method for weaving the woven cloth include, but are not particularly limited to, plain weave, basket weave, and twill weave. The thickness of the base material is not particularly limited. However, the thickness is preferably 0.01 to 0.3 mm, for example. In view of moisture absorption-heat resistance, a base material surface-treated by a silane coupling agent or the like, and a base material obtained by physically opening a woven cloth can be suitably used as the base material. Above all, from the viewpoints of strength and water absorbance, the base material is preferably a glass cloth having a thickness of 200 μm or less and a mass of 250 g/m² or less. A glass woven cloth made of a glass fiber of E-glass is more preferable. A film made of polyimide, polyamide, and polyester or the like can also be used as the base material. The thickness of the film is not particularly limited. However, the thickness is preferably 0.002 to 0.05 mm. The film is more preferably a film surface-treated by means of plasma treatment or the like.

<<Metal Foil-Clad Laminate>>

A laminate of the present embodiment is a metal foil-clad laminate comprising the above-mentioned prepreg. Because the above-mentioned prepreg is used in the laminate of the present embodiment, the laminate has excellent adhesive properties, low water absorbance, heat resistance in moisture absorption, insulating reliability, and appearance.

The laminate of the present embodiment can be produced by carrying out laminate-molding using the above-mentioned prepreg. Specifically, the laminate can be produced by providing one above-mentioned prepreg or stacking a plurality of the prepregs, disposing a metal foil made of copper or aluminum or the like on one surface or both surfaces of the prepreg or the stack of the prepregs, if necessary, and laminate-molding the resultant set. The metal foil to be used is not particularly limited so long as it is used for a printed wiring board material. However, known copper foils such as a rolled copper foil and an electrolytic copper foil are preferable. The thickness of the metal foil is not particularly limited. However, the thickness is preferably 2 to 70 μm, and more preferably 2 to 35 μm. As the laminate-molding method, a usual method for molding a laminate and a multilayered board for printed wiring boards can be applied. Examples thereof include a method using a multistage pressing machine, a multistage vacuum pressing machine, a continuous molding machine, and an autoclave molding machine or the like. In the molding method, a temperature is preferably 100 to 300° C.; a pressure is preferably 2 to 100 kgf/cm², and a heating time is preferably in the range of 0.05 to 5 hours. Furthermore, postcuring may also be performed at a temperature of 150 to 300° C. if needed. The laminate of the present embodiment may be a multilayered board formed by laminate-molding of a combination of the above-mentioned prepreg with a separately produced wiring board for inner layers.

The laminate of the present embodiment may be suitably used as the printed wiring board by forming a predetermined wiring pattern. The laminate of the present embodiment has a low coefficient of thermal expansion, high flame retardance, and good moldability and drill workability. The laminate can be particularly effectively used as the printed wiring board for semiconductor packages requiring the performances.

<<Printed Wiring Board>>

A printed wiring board of the present embodiment is a printed wiring board containing an insulating layer and a conductor layer formed on the surface of the insulating layer, in which the insulating layer contains the above-mentioned resin composition.

The printed wiring board of the present embodiment can be produced by the following method, for example. First, the surface of the above-mentioned metal foil-clad laminate is etched to form an inner layer circuit, thereby producing an inner layer substrate. The surface of the inner layer circuit of the inner layer substrate is surface-treated to increase bonding strength if needed. Then, a required number of the above-mentioned prepregs are stacked on the surface of the inner layer circuit. A metal foil for outer layer circuits is further laminated on the outside thereof. These are heated and pressurized for integral molding. Thus, a multilayer laminate is produced, in which a base material and an insulating layer containing a cured product of a thermosetting resin composition are formed between the inner layer circuit and the metal foil for outer layer circuits. Then, the multilayer laminate is subjected to drilling for through holes or via holes. A plated metal film is then formed on the wall surface of the hole to electrically connect the inner layer circuit and the metal foil for outer layer circuits. Furthermore, the metal foil for outer layer circuits is etched to form the outer layer circuits, thereby producing the printed wiring board.

In the printed wiring board of the present embodiment, the resin composition layer (the layer containing the above-mentioned resin composition) in the metal foil-clad laminate using the above-mentioned prepreg (the base material and the above-mentioned resin composition with which the base material is impregnated) constitutes the insulating layer containing the above-mentioned resin composition.

EXAMPLES

Hereinafter, the present invention will be described in detail with reference to Examples and Comparative Examples. However, the present invention is not limited to these Examples in any way.

Synthetic Example 1

Synthesis of Mixture of Biphenyl Aralkyl-Based Cyanate Ester Compound

A biphenyl aralkyl-based phenol compound (MEH-7852, OH group equivalent: 183 g/eq, manufactured by Meiwa Chemical Co., Ltd.) was used as a raw material. The biphenyl aralkyl-based phenol compound was analyzed according to $^1$H-NMR measurement. As a result, the biphenyl aralkyl-based phenol compound contained components represented by the following formulae (10) to (12) at rates shown in Table 1-A.

In 475 mL of chloroform, 1.22 mol (in terms of OH group) of the biphenyl aralkyl-based phenol compound and 1.82 mol of triethylamine were dissolved to obtain a solution 1. The solution 1 was dropwise added to 600 g of a 2.43 mol cyan chloride/methylene chloride solution at −10° C., taking 1.5 hours to obtain a solution 2. The solution 2 was stirred for 30 minutes, and a mixed solution of 0.49 mol triethylamine and methylene chloride (50 g) was then dropwise added to the solution 2 to obtain a solution 3. The solution 3 was further stirred for 30 minutes to complete the reaction. The hydrochloride of triethylamine was filtered from the solution 3 to obtain a filtrate. The obtained filtrate was washed with 1000 mL of 0.1 N hydrochloric acid and then with 1000 mL of water, and this washing was repeated four times. After the filtrate washed was dried with sodium sulfate, this was evaporated at 75° C. to obtain a yellow solid crystal. The obtained crystal was washed with diethyl ether and hexane, and then dried under reduced pressure to obtain a brown solid matter. As a result of analyzing the obtained brown solid matter according to an infrared absorption spectrum, the brown solid matter was a mixture (the absorption of a cyanate group was confirmed around 2264 cm$^{-1}$ in the infrared absorption spectrum) of biphenyl aralkyl-based cyanate ester compounds represented by the following formulae (13) to (15). As a result of measurement in $^1$H-NMR, the composition rates of the cyanate ester compounds represented by the following formulae (13) to (15) in the mixture were shown in Table 1-B.

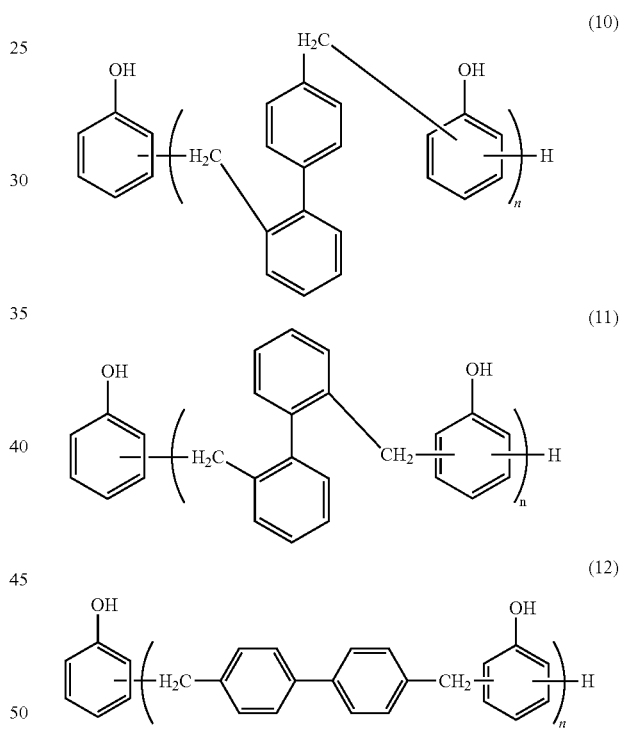

(In the formulae (10) to (12), n is an integer of 1 to 50).

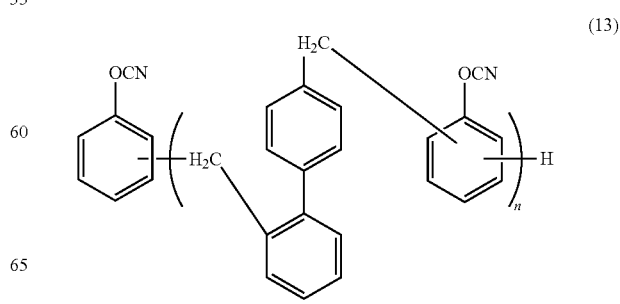

-continued

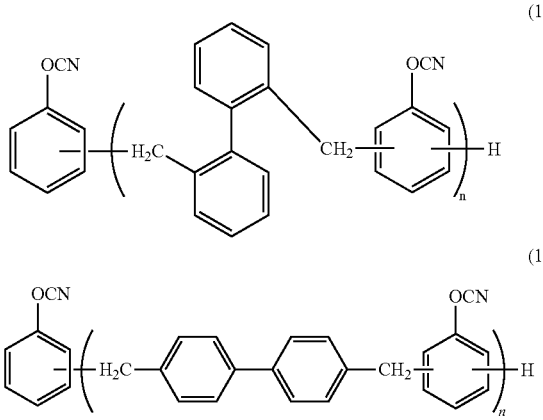

(14)

(15)

(In the formulae (13) to (15), n is an integer of 1 to 50).

TABLE 1

| Item | Unit | ratio |
|---|---|---|
| A. Mixing ratio of phenol resins used for Synthetic Example 1 | | |
| Formula (10) | mol % | 50.0 |
| Formula (11) | mol % | 32.0 |
| Formula (12) | mol % | 18.0 |
| OH equivalent | g/eq | 183.0 |
| B. Mixing ratio of cyanate ester resins synthesized in Synthetic Example 1 | | |
| Formula (13) | mol % | 50.0 |
| Formula (14) | mol % | 32.0 |
| Formula (15) | mol % | 18.0 |

Synthetic Example 2

Synthesis of 4,4'-Biphenyl Aralkyl-Based Cyanate Ester Compound

In 900 mL of 3-methyltetrahydrofuran, 1.1 mol (in terms of OH group) of 4,4'-biphenyl aralkyl-based phenol resin (KAYAHARDGPH-65, OH group equivalent: 204 g/eq, manufactured by Nippon Kayaku Co., Ltd.) and 1.6 mol of triethylamine were dissolved to obtain a solution 1-2. The solution 1-2 was dropwise added to 2500 g of a 2.2 mol cyan chloride/methylene chloride solution at −10° C., taking 1.5 hours to obtain a solution 2-2. The solution 2-2 was stirred for 30 minutes, and a mixed solution of 0.4 mol triethylamine and methylene chloride (100 g) was then dropwise added to the solution 2-2 to obtain a solution 3-2. The solution 3-2 was further stirred for 30 minutes to complete the reaction. The hydrochloride of triethylamine was filtered from the solution 3-2 to obtain a filtrate. The obtained filtrate was washed with 1000 mL of 0.1 N hydrochloric acid and then with 1000 mL of water, and this washing was repeated four times. After the filtrate washed was dried with sodium sulfate, this was evaporated at 75° C. to obtain a yellow solid crystal. The obtained crystal was washed with diethyl ether and hexane, and then dried under reduced pressure to obtain a brown solid matter. As a result of analyzing the obtained brown solid matter according to an infrared absorption spectrum, the brown solid matter was a 4,4'-biphenyl aralkyl-based cyanate ester compound represented by the following formula (16) (the absorption of a cyanate group was confirmed around 2264 cm$^{-1}$ in the infrared absorption spectrum).

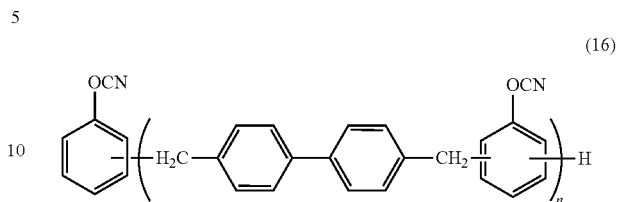

(16)

(In the formula (16), n is an integer of 1 to 50.)

Example 1

Fifty parts by mass of the mixture of biphenyl aralkyl-based cyanate ester compounds synthesized in Synthetic Example 1, 50 parts by mass of a biphenyl aralkyl-based epoxy resin (NC3000-H manufactured by Nippon Kayaku Co., Ltd.), 0.04 part by mass of zinc octylate (manufactured by Nihon Kagaku Sangyo Co., Ltd.), and 100 parts by mass of synthetic silica (SC-2050MR manufactured by Admatechs Co., Ltd., average particle diameter: 0.8 μm) were mixed to obtain a resin composition. Methyl ethyl ketone was added to the resin composition to obtain a varnish. The varnish was further diluted with methyl ethyl ketone. The diluted varnish was impregnated into and coated on an E-glass cloth (thickness: 0.1 mm). The impregnated and coated E-glass cloth was dried under heat at 160° C. for 4 minutes, to obtain prepregs having a resin content of 48% by mass. Next, four prepregs obtained above were stacked and 18 μm-thick electrolytic copper foils were placed on the upper and lower surfaces of the stack of the prepregs. The prepregs and the copper foils were pressed at a pressure of 30 kgf/cm$^2$ and at a temperature of 220° C. for 120 minutes, to obtain a copper-clad laminate having a thickness of 0.4 mm.

Comparative Example 1

Fifty parts by mass of the 4,4'-biphenyl aralkyl-based cyanate ester compound obtained in Synthetic Example 2, 50 parts by mass of a biphenyl aralkyl-based epoxy resin (NC3000-H manufactured by Nippon Kayaku Co., Ltd.), and 0.04 part by mass of zinc octylate (manufactured by Nihon Kagaku Sangyo Co., Ltd.) were dissolved and mixed in methyl ethyl ketone. To the resultant mixture, 100 parts by mass of synthetic silica (SC-2050MR manufactured by Admatechs Co., Ltd., average particle diameter: 0.8 μm) was further mixed to obtain a varnish. However, in the obtained varnish, the 4,4'-biphenyl aralkyl-based cyanate ester compound obtained in Synthetic Example 2 was insoluble in methyl ethyl ketone. Thereby, the obtained varnish was impregnated into and coated on an E-glass cloth (thickness: 0.1 mm) in a state where the mixture of the cyanate ester compounds was dispersed in a solvent (methyl ethyl ketone). The E-glass cloth was dried under heat at 160° C. for 4 minutes, to obtain prepregs having a resin content of 48% by weight. Next, four prepregs obtained above were stacked and 18 μm-thick electrolytic copper foils were placed on the upper and lower surfaces of the stack of the prepregs. The prepregs and the copper foils were pressed at a pressure of 30 kgf/cm$^2$ and at a temperature of 220° C. for 120 minutes, to obtain a copper-clad laminate having a thickness of 0.4 mm.

Comparative Example 2

A copper-clad laminate was obtained in the same manner as in Example 1 except that 50 parts by mass of a bisphenol A-based cyanate ester compound (CA210 manufactured by Mitsubishi Gas Chemical Co., Inc.) was used in place of the mixture of the biphenyl aralkyl-based cyanate ester compounds synthesized in Synthetic Example 1.

Comparative Example 3

A copper-clad laminate was obtained in the same manner as in Example 1 except that 50 parts by mass of a phenol novolac-based cyanate ester compound (PT-30 manufactured by Lonza Japan Ltd.) was used in place of the mixture of the biphenyl aralkyl-based cyanate ester compounds synthesized in Synthetic Example 1.

[Evaluation of Physical Properties of Copper-Clad Laminates]

The physical properties of the copper-clad laminates obtained from Example 1 and Comparative Examples 1 to 3 were measured by the following methods. The measurement results are shown in Table 2.

[Copper Foil Peel Strength]

The copper foil peel strengths (unit: kgf/cm) of the copper-clad laminates obtained from Example 1 and Comparative Examples 1 to 3 were measured in conformity with JIS C6481. The obtained copper-clad laminate having higher copper foil peel strength was evaluated as a copper-clad laminate having excellent adhesive properties.

[Moisture Absorption-Heat Resistance]

A sample (50 mm×50 mm) was prepared by using the copper-clad laminates obtained from Example 1 and Comparative Examples 1 to 3. The entire copper foil of the sample other than a copper foil on the half of one surface of the sample was removed by etching, to obtain a specimen. The specimen was treated with a pressure cooker testing machine (PC-3 type) at 121° C. at 2 atmospheric pressure for 3 hours. Then, the specimen was immersed in solder at 260° C. for 30 seconds. An appearance change of the specimen after being immersed was visually observed, and moisture absorption-heat resistance was evaluated according to the following criteria. The moisture absorption-heat resistance was evaluated in the same manner as in the above description except that a treating time according to the pressure cooker testing machine was changed to 4 hours and 5 hours.

(Evaluation Criteria)

"A" (Good): The specimen after being immersed was not swelled.

"B" (Poor): The specimen after being immersed was swelled.

[Existence or Non-Existence of Voids]

After the copper-clad laminates obtained from Example 1 and Comparative Examples 1 to 3 were etched to remove the copper foils, the existence or non-existence of voids was confirmed.

[Appearances of Laminates]

After the copper-clad laminates obtained from Example 1 and Comparative Examples 1 to 3 were etched to remove the copper foils, the appearances of the laminates (existence or non-existence of unevenness) were visually confirmed.

[Water Absorption Rate]

The copper-clad laminates obtained from Example 1 and Comparative Examples 1 to 3 were etched to remove the copper foils. The laminates after the copper foils were removed were treated with a pressure cooker testing machine (PC-3 type) at 121° C. under 2 atmospheric pressure for 5 hours in conformity with JIS C6481. The water absorption rates of the treated laminates were measured.

TABLE 2

|  |  | Example 1 | Comparative Example 1 | Comparative Example 2 | Comparative Example 3 |
|---|---|---|---|---|---|
| solubility of cyanate ester resin in general solvent (MEK) |  | good | not dissolved at all | good | good |
| (1) existence or non-existence of voids |  | non-existence | existence of voids | non-existence | non-existence |
| (2) appearance of laminate after being etched |  | good | existence of unevenness | good | good |
| (3) copper foil peel strength | kg/cm | 1.00 | 1.00 | 1.00 | 0.85 |
| (4) water absorption rate (PCT 120° C./5 hrs) | % | 0.33 | 0.38 | 0.50 | 0.62 |
| (5) moisture absorption-heat resistance | 3 h | A, A, A, A | A, A, A, A | A, A, A, A | A, A, A, B |
|  | 4 h | A, A, A, A | A, A, A, A | A, A, B, B | A, A, A, B |
|  | 5 h | A, A, A, A | A, A, A, B | A, A, B, B | A, A, A, B |

The present application claims priority from Japanese Patent Application (Japanese Patent Application No. 2011-241172) filed to the Japan Patent Office on Nov. 2, 2011, the contents of which are hereby incorporated by reference.

INDUSTRIAL APPLICABILITY

Since the resin composition of the present invention has high solvent solubility and excellent handleability, and can realize a metal foil-clad laminate having excellent adhesive properties, low water absorbance, moisture absorption-heat resistance, insulating reliability, and appearance, the resin composition is suitable for a high-density-support printed wiring board material, and has industrial applicability.

The invention claimed is:

1. A resin composition comprising:
a mixture (A) of at least two cyanate ester compounds selected from the group consisting of a cyanate ester compound (A1) having a structural unit represented by the following general formula (1), a cyanate ester compound (A2) having a structural unit represented by the following general formula (2), and a cyanate ester compound (A3) having a structural unit represented by the following general formula (3);
an epoxy resin (B); and
an inorganic filler (C):

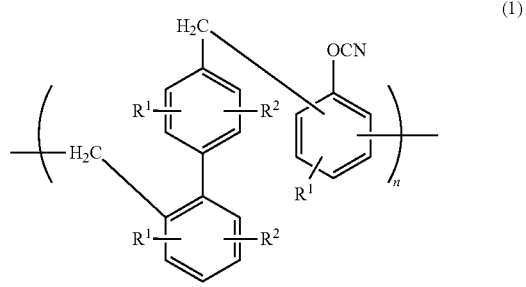

-continued (2)

[Structure 2: polymer with R¹, R² substituted biphenyl and OCN-substituted phenyl groups connected via CH₂ linkages, with repeat unit n]

(3)

[Structure 3: polymer with R¹, R² substituted biphenyl (para) and OCN-substituted phenyl groups connected via CH₂ linkages, with repeat unit n]

wherein n is each independently an integer of 1 or more, and $R^1$ and $R^2$ are each independently a hydrogen atom, an alkyl group, or an aryl group.

2. The resin composition according to claim 1, wherein a mixing ratio of the cyanate ester compound (A1) is 30 to 70 mol %, a mixing ratio of the cyanate ester compound (A2) is 15 to 45 mol %, and a mixing ratio of the cyanate ester compound (A3) is 5 to 35 mol %, based on 100 mol % of the total of the mixture (A) of the cyanate ester compounds.

3. The resin composition according to claim 2, wherein n in the general formulae (1) to (3) is each independently an integer of 1 to 50.

4. The resin composition according to claim 2, wherein the inorganic filler (C) is silica.

5. The resin composition according to claim 2, wherein a content of the mixture (A) of the cyanate ester compounds is 10 to 90 parts by mass based on 100 parts by mass of the total of the mixture (A) of the cyanate ester compounds and the epoxy resin (B).

6. The resin composition according to claim 2, wherein a content of the inorganic filler (C) is 10 to 1000 parts by mass based on 100 parts by mass of the total amount of the mixture (A) of the cyanate ester compounds and the epoxy resin (B).

7. A printed wiring board comprising an insulating layer, and a conductor layer formed on a surface of the insulating layer, wherein the insulating layer comprises the resin composition according to claim 2.

8. The resin composition according to claim 1, wherein n in the general formulae (1) to (3) is each independently an integer of 1 to 50.

9. The resin composition according to claim 1, wherein the epoxy resin (B) is an aralkyl-based epoxy resin.

10. The resin composition according to claim 9, wherein the aralkyl-based epoxy resin is at least one selected from the group consisting of a phenol phenyl aralkyl-based epoxy resin represented by the following general formula (4), a phenol biphenyl aralkyl-based epoxy resin represented by the following general formula (5), and a naphthol aralkyl-based epoxy resin represented by the following general formula (6):

(4)

[Structure 4: diepoxide with two glycidyl ether-substituted phenyl groups connected via C(R³)(R⁴)-phenyl-C(R⁵)(R⁶) bridge with repeat m]

(5)

[Structure 5: diepoxide with two glycidyl ether-substituted phenyl groups connected via C(R⁷)(R⁸)-biphenyl-C(R⁹)(R¹⁰) bridge with repeat m]

(6)

[Structure 6: diepoxide with two glycidyl ether-substituted naphthyl groups connected via C(R¹¹)(R¹²)-phenyl-C(R¹³)(R¹⁴) bridge with repeat m]

wherein m is each independently an integer of 1 to 50; $R^3$ to $R^{14}$ are each independently a hydrogen atom, a methyl group, an ethyl group, or an aryl group.

11. The resin composition according to claim 1, wherein the inorganic filler (C) is silica.

12. The resin composition according to claim 1, wherein a content of the mixture (A) of the cyanate ester compounds is 10 to 90 parts by mass based on 100 parts by mass of the total of the mixture (A) of the cyanate ester compounds and the epoxy resin (B).

13. The resin composition according to claim 1, wherein a content of the inorganic filler (C) is 10 to 1000 parts by mass based on 100 parts by mass of the total amount of the mixture (A) of the cyanate ester compounds and the epoxy resin (B).

14. A prepreg obtained by impregnating a base material with the resin composition according to claim 1 or applying the resin composition to a base material.

15. A metal foil-clad laminate comprising the prepreg according to claim 14.

16. A printed wiring board comprising an insulating layer, and a conductor layer formed on a surface of the insulating layer, wherein the insulating layer comprises the resin composition according to claim 1.

* * * * *